F. B. ROLAND & C. CHANDLER.
VEHICLE FENDER.
APPLICATION FILED DEC. 11, 1914.
1,201,103.
Patented Oct. 10, 1916.
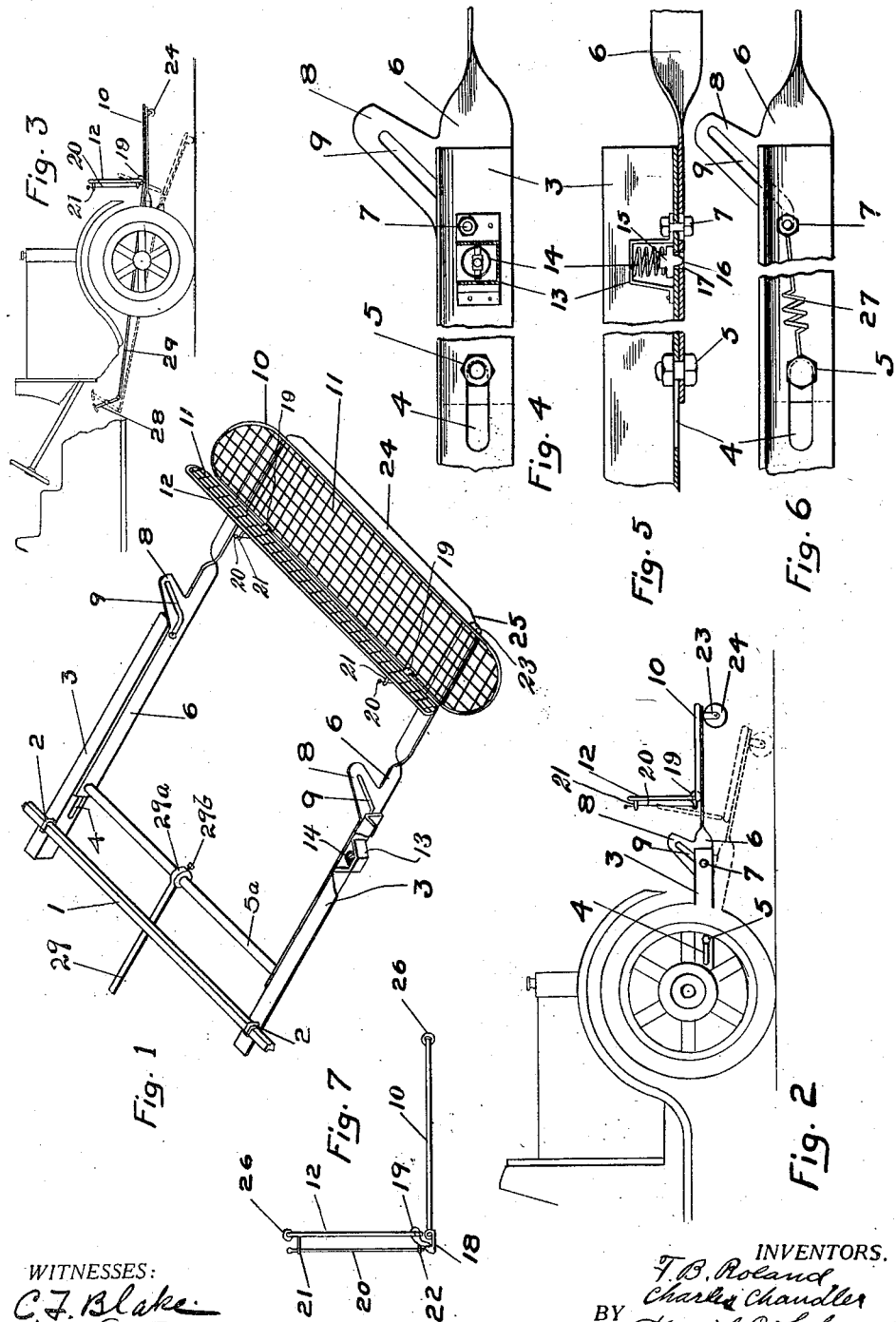
WITNESSES:
INVENTORS.
F. B. Roland
Charles Chandler
BY
David E. Lofgren
ATTORNEY

UNITED STATES PATENT OFFICE.

FRED B. ROLAND AND CHARLES CHANDLER, OF PORTLAND, OREGON.

VEHICLE-FENDER.

1,201,103.  Specification of Letters Patent.  Patented Oct. 10, 1916.

Application filed December 11, 1914. Serial No. 876,704.

*To all whom it may concern:*

Be it known that we, FRED B. ROLAND and CHARLES CHANDLER, citizens of the United States, residing at Portland, in the county of Multnomah, State of Oregon, have invented certain new and useful Improvements in Vehicle-Fenders, of which the following is a specification.

Our invention relates to vehicle fenders and particularly to automobile fenders, and the objects of our invention are: first, to provide a fender that shall automatically fall to the ground upon coming into contact with any person or object, and thus assume a position adapted to deposit said person or object upon the fender; second, to provide a fender that may be instantly dropped upon the ground by the driver of the vehicle when contact with any person or object is imminent; third, to provide a fender that is light in weight, strong and of economical construction. We attain these objects by the mechanism described herein and illustrated in the accompanying drawing, which therefore forms a part of this application for Letters Patent, and in which:—

Figure 1 is a perspective view of our invention. Fig. 2 is a side elevation of our invention applied to an automobile. Fig. 3 is a side elevation of our invention applied to an automobile, showing the attachment to the operating lever. Fig. 4 is a side elevation of a portion of the supporting bars on an enlarged scale. Fig. 5 is a section plan of Fig. 4. Fig. 6 is a similar view to Fig. 4, illustrating an alternative construction. Fig. 7, an end elevation of the fender guards showing the method of locking the vertical guard in place.

Like characters designate like parts throughout the several views of the drawing, in which numeral 1 is the front axle of the vehicle to which our invention is affixed by means of clips 2 passing around said axle and through the side bars 3. Each of said side bars 3 has an elongated slot 4 near its rearward end adapted to receive a rod 5ᵃ rigidly attached to extension bars 6 and sliding freely in said slots 4, as shown in Fig. 1. In place of rod 5ᵃ, a modification consisting of pins or bolts 5 may be used as shown in Figs. 4, 5 and 6. Rigidly attached to each side bar 3 near its forward end is a pin or bolt 7.

Each extension bar 6 has an upwardly extending arm 8 in which is an elongated slot 9 adapted to engage with the pin or bolt 7. The angle of slots 9 is such as to cause the extension bars 6 to drop easily upon the application thereto of a very small force in a rearward direction. Upon the forward end of extension rods 6 is mounted a frame 10 of substantially rectangular construction and extending the entire width of the vehicle as shown in Fig. 1, said frame being covered or filled in with woven wire mesh 11 or other suitable material. Hinged to the rearward edge of frame 10 is a similar frame 12 covered with the same material.

Mounted upon the inner side of each side frame 3 is a bracket 13 containing a spring 14. Said spring contacts with a dog 15 having an extension 16 protruding through an orifice in the side frame 3 and into an orifice 17 in the extension bar 6. Said extension 16 on dog 15 is constructed with a blunt rounded contour adapted to secure extension bars 6 in place and hold same against displacement due to vibration, and also to be caused to recede into bracket 13 under the impulse of a rearward force upon extension bar 6, and thus allow said extension bar to drop, as shown in dotted lines in Figs. 2 and 3. When the fender is raised after having been dropped the dog 15 snaps into place in orifice 17 and thus secures the fender in its initial position.

The vertical frame 12 is secured in its position as shown in Fig. 7, in which a spring hook 18 is attached to frame 10 and a dog 19 adapted to engage with said hook is rigidly attached to frame 12. A rod 20 mounted in lugs 21 and 22 upon frame 12 and dog 19 respectively, is adapted to contact with spring hook 18 and depress same to disengage dog 19 and allow frame 12 to fold over upon frame 10 when desired.

Beneath the forward end of each extension bar 6 is a lug 23, and between these lugs is mounted a roller 24 having conical shaped ends 25 as shown in Figs. 1 and 2. By means of said conical ends the roller is enabled to cross car tracks and the like without becoming engaged therewith.

The edges of frames 10 and 12 may be covered with rubber hose or other suitable material to protect a person from injury, as shown at 26 in Fig. 7.

In place of bracket 13, spring 14 and dog 15 as shown in Figs. 4 and 5, a modification comprising a spring 27 connecting pins or bolts 5 and 7 may be used, as shown in Fig.

6, said spring 27 being adapted to retain pins 5 and their respective extension bars 6 in their forwardmost position, in which position said extension bars 6 are sustained in their uppermost position by pins or bolts 7. The construction of Figs. 4 and 5 is preferred because it does not return the fender automatically to the initial position upon the removal of the object struck, as does that of Fig. 6, but requires the attention of the driver or other person to raise the fender before the vehicle can proceed.

Without in any way interfering with the automatic operation of our invention the same may be arranged to be operated by the vehicle driver as shown in Figs. 1 and 2, in which 28 is a lever conveniently placed for operation by the driver, and 29 a reach rod or link pivotally attached to lever 28, and also adjustably attached by means of boss 29ª and set screw 29ᵇ, to rod 5ª. By this arrangement the driver may, by manipulation of lever 28, cause the fender to drop into position as shown in dotted lines, or the fender will drop automatically upon coming into contact with any obstruction.

Our invention may be constructed of any material and of any size deemed suitable for a device of this character and while we have illustrated and described a combination of elements and arrangement of parts considered necessary in materializing our invention, we wish to include in this application for Letters Patent, all mechanical equivalents and substitutes that may fairly be considered to come within the scope and purview of our invention as illustrated and described, and particularly defined in the appended claims.

Having illustrated and described our invention so that others skilled in the art may be enabled to construct and use same, what we claim as new and wish to secure by Letters Patent, is:—

1. A duality of members rigidly attached to a vehicle axle, an extension member slidably attached to each of said members, an upwardly extending slotted arm integrally attached to each extension member and a pair of covered fender frames hinged together and supported upon said extension members, substantially as described.

2. A duality of members adapted to be rigidly attached to a vehicle axle, pins attached to said members and adapted to slidably support members forwardly extending therefrom, forwardly extending members slidably mounted upon said pins having an upwardly extending inclined slot engaging with one of said pins and covered fender frames mounted upon said forwardly extending members, substantially as described.

3. A vehicle fender comprising a duality of suitably covered frames mounted upon slidable extension members, said extension members having upwardly inclined slots adapted to drop said fender frames upon rearward motion thereof, supporting members for said extension members and means to engage said supporting members with said extension members to retain the fender frames in position and to release same when moved rearwardly, substantially as described.

4. In a device of the character described, a vehicle axle, parallel forwardly extending supporting members rigidly attached to said axle, parallel extension members slidably mounted upon said supporting members, upwardly inclined slotted arms integral with said extension members, a suitably covered horizontal fender frame supported upon said extension members, a suitably covered vertical fender frame hinged to said horizontal frame, means to hold said vertical frame in position, a spring mounted dog upon each supporting member adapted to engage and support said extension members and to release same when fender strikes an obstruction, an operating lever within the vehicle and operating means connecting said lever with said fender, substantially as described.

In witness whereof we claim the foregoing as our own, we hereunto attach our signatures in the presence of two witnesses.

F. B. ROLAND.
CHARLES CHANDLER.

Witnesses:
J. A. BACKSTRAND,
E. T. TAGGART.

Copies of this patent may be obtained for five cents each, by addressing the "Commissioner of Patents, Washington, D. C."